United States Patent [19]
Cho et al.

[11] Patent Number: 5,835,950
[45] Date of Patent: Nov. 10, 1998

[54] SELF-INVALIDATION METHOD FOR REDUCING COHERENCE OVERHEADS IN A BUS-BASED SHARED-MEMORY MULTIPROCESSOR APPARATUS

[75] Inventors: Sang-yuen Cho, Minneapolis; Gyung-ho Lee, Plymouth, both of Minn.

[73] Assignee: Samsung Electronics Co., Ltd., Suwon, Rep. of Korea

[21] Appl. No.: 679,083

[22] Filed: Jul. 12, 1996

[51] Int. Cl.⁶ ................................................. G06F 13/00
[52] U.S. Cl. ........................................... 711/144; 711/145
[58] Field of Search .................... 395/449, 468, 395/469, 470, 471, 472, 473; 711/122, 141–146

[56] References Cited

U.S. PATENT DOCUMENTS

| | | | |
|---|---|---|---|
| 5,369,753 | 11/1994 | Tipley | 395/449 |
| 5,557,769 | 9/1996 | Bailey et al. | 395/473 |
| 5,572,702 | 11/1996 | Sarangdhar et al. | 395/473 |
| 5,588,131 | 12/1996 | Borrill | 395/473 |
| 5,623,628 | 4/1997 | Brayton et al. | 711/141 |
| 5,737,755 | 4/1998 | Ebrahim et al. | 711/141 |

OTHER PUBLICATIONS

Anderson, C. et al. "Two Techniques for Improving Performance on Bus–Based Multiprocessors", Proceedings of the First IEEE Symposium on High–Performance Computer Architecture, pp. 264–275 Jan. 1995.

Lebeck, A. et al. "Dynamic Self–Invalidation: Reducing Coherence Overhead in Shared–Memory Multiprocessors", Computer Architecture News, pp. 48–59 May 1995.

Dahlgren, F. "Boosting the Performance of Hybrid Snooping Cache Protocols", Computer Architecture News, pp. 60–69 May 1995.

Hennessy, J. et al. Computer Architecture: A Quantitative Approach, pp. 467–474 1990.

*Primary Examiner*—Tod R. Swann
*Assistant Examiner*—Conley B. King, Jr.
*Attorney, Agent, or Firm*—Jones & Volentine, L.L.P.

[57] ABSTRACT

The present invention relates to a method for reducing overheads of cache coherence enforcement in a shared-bus multiprocessors apparatus by utilizing a self-invalidation technique at local processor nodes as an extension to write-invalidate protocols in the shared-bus environment, and to an apparatus therefor.

9 Claims, 10 Drawing Sheets

| State | Event | Request | Reply Sl* | Reply Shared* | New State |
|---|---|---|---|---|---|
| I | Rmiss | Rreq | 0 | 0 | E |
|  | Rmiss | Rreq | 1 | 0 | E+ |
|  | Rmiss | Rreq | 0 | 1 | S |
|  | Rmiss | Rreq | 1 | 1 | S+ |
|  | Wmiss | Wreq | 0 | 0 | M |
|  | Wmiss | Wreq | 1 | 0 | M+ |
| S | Read | — | — | — | no change |
|  | Write | Ireq | — | — | M |
| S+ | Read | — | — | — | no change |
|  | Write | Ireq | — | — | M+ |
|  | Sync | — | — | — | I |
| E | Read | — | — | — | no change |
|  | Write | — | — | — | M |
| E+ | Read | — | — | — | no change |
|  | Write | — | — | — | M+ |
| M | Read | — | — | — | no change |
|  | Write | — | — | — | no change |
| M+ | Read | — | — | — | no change |
|  | Write | — | — | — | no change |

Local Events

FIG.2A

| State | Request | New State | Assert SI* | Assert Shared* | Data |
|---|---|---|---|---|---|
| S | Rreq | no change | 0 | 1 | — |
|  | Wreq | — | 1 | 0 | — |
|  | Ireq | — | 0 | 0 | — |
| S+ | Rreq | no change | 1 | 1 | — |
|  | Wreq | — | 1 | 0 | — |
|  | Ireq | — | 0 | 0 | — |
| E | Rreq | S | 0 | 1 | — |
|  | Wreq | — | 1 | 0 | — |
| E+ | Rreq | S+ | 1 | 1 | — |
|  | Wreq | — | 1 | 0 | — |
| M | Rreq | S+ | 1 | 1 | Provide |
|  | Wreq | — | 1 | 0 | Provide |
| M+ | Rreq | — | 1 | 1 | Provide |
|  | Wreq | — | 1 | 0 | Provide |

Bus-induced Actions

FIG.2B

| State | Encoding | | | | | | |
|-------|---|---|---|---|---|---|---|
| I  | 0 | 0 | 0 | 0 | 0 | 0 | 0 |
| E  | 0 | 0 | 0 | 0 | 0 | 0 | 1 |
| E+ | 0 | 0 | 0 | 0 | 0 | 1 | 1 |
| S  | 0 | 0 | 0 | 0 | 1 | 0 | 0 |
| S+ | 0 | 0 | 0 | 0 | 1 | 0 | 1 |
| M  | 0 | 0 | 0 | 1 | 0 | 1 | 1 |
| M+ | 0 | 0 | 0 | 1 | 1 | 1 | 1 |

Column Reset At Barriers

FIG. 4

SELF-INVALIDATION METHOD FOR REDUCING COHERENCE OVERHEADS IN A BUS-BASED SHARED-MEMORY MULTIPROCESSOR APPARATUS

BACKGROUND OF THE INVENTION

The present invention relates to the data processing arts and, more particularly to a shared-bus multiprocessor data processing apparatus utilizing shared memory caches and private caches at each processor node of the apparatus.

Generally, a shared-bus multiprocessors computer architecture includes at least one, and typically a plurality of, central processing unit(s) (CPU) and local memory, I/O, etc. resident at each of a plurality of nodes. Often physical memory address space may be permanently divided into two regions: the lower half being local memory (most significant bit="0"), accessible only by the processor(s) at the local node, while the upper half (most significant bit="1") defines shared memory, which may be accessible by all nodes. There frequently is no hardware support to maintain coherency among copies of shared data blocks contained in a plurality of nodes within the architecture. In such a case, coherency has mainly been left entirely to the software.

The Bull HN Shared Buffer Architecture (SBA) expands upon this architecture by introducing a hardware mechanism that maintains coherency among copies of data that originated in the shared memory of a particular node that is accessible to all nodes, but are contained in the cache memories at nodes elsewhere in the architecture. This improves the performance of the architecture by permitting the different nodes to perform some operations on shared data in parallel and with shorter access times.

A variation of SBA, the Bull HN Distributed Shared Buffer Architecture (DSBA) uses distributed shared memory instead of a centralized shared memory, a configuration which has a number of advantages in terms of performance and availability as well as compatibility with some existing computer products. The address division between private and shared memory at the individual nodes remains the same, but the shared memory blocks are replicated at each node of the architecture, thus the shared memory permits a simultaneous read access by all nodes. A hardware coherency mechanism ensures that the data in the shared memories remains coherent.

The shared bus has been a popular choice in implementing shared-memory multiprocessors architectures. In such systems, cache memories play an essential role in that they create an image of low-latency main memory to the processors and filter out processor requests to the main memory, thus saving valuable bandwidths of the bus. A "snooping protocol" is usually employed in a shared-bus multiprocessor to keep the processor caches coherent, and this simplifies the system design considerably, compared to general cache-coherent multiprocessors. A "write-invalidate" policy, which has been chosen for many snooping protocol implementations, allows multiple processors to share an accessible data block, but requires a processor to obtain an exclusive copy before modifying it.

There are at least three overheads incurred in enforcing cache coherence in a shared-bus multiprocessor using a write-invalidate snooping protocol. Firstly, the bus bandwidth is consumed, i.e., invalidation transactions transmitted by the bus are generated when a processor writes to a shared block. Traffic for coherence will increase contention in the bus, which can in turn increase the memory latency seen by a processor. Secondly, the machine experiences "coherence misses." A "coherence miss" occurs when a read reference which misses in the local cache due to a previous invalidation by a remote processor. With a large cache block size there can be a high degree of false sharing, and the coherence misses might become a critical portion of the overall cache misses. Thirdly, coherence actions need to lock up the cache state and tag memory and possibly update it, which can increase the contention with the local processor. A duplicated cache state and tag memory can minimize some of the contention in some situations.

Controlling bus traffic in modern shared-bus multiprocessors is very important. For example, with 16 processors, a block size of 64 Bytes and a 64-KB data cache, the total bandwidth for some parallel benchmark programs ranges from almost 500 MB/sec (for Barnes in SPLASH-2) to over 9400 MB/sec (for Ocean), assuming a processor that issues a data reference every 5 nanoseconds (ns). In comparison, the POWERpath-2 bus of Silicon Graphics Challenge, one of the highest bandwidth multiprocessors, provides 1200 MB of bandwidth. As microprocessors become faster and demand more bandwidth, the already limited scalability of a shared-bus architecture decreases even further. Thus, finding new and further ways to reduce the demand for use of the bus bandwidth becomes more important in order to permit further scale-ups of a shared-bus architecture.

Understanding the typical status labels for cache blocks (cache "states") in a shared-bus shared-memory is essential to appreciate the amount of bus traffic necessary to update such states within the architecture to maintain memory coherence. Typically a cache block is identified as "migratory" if one processor has the block in a "dirty" state (data block has been written to and changed), and another processor reads it and then writes to it. Adaptive coherence protocols optimized for migratory data dynamically identify migratory data blocks at run time, and try to eliminate invalidation messages for such blocks. They speculate about future invalidations by the same processor when responding to a read request. A cache block appears to be migratory "if, at the time of a write-hit to a block in shared state, (i) there are exactly two cached copies of the block in the entire architecture, and (ii) the processor currently requesting the invalidation operation is not the processor that requested the previous invalidation operation."

Once a cache block is deemed to be migratory, further read requests will obtain the block in an exclusive state. Compiler algorithms to identify and optimize for migratory sharing patterns have been previously studied. (See for example, Proc. 6th Intl. Conf. Arch. Sup. Prog. Lang. Oper. Sys., pp. 286–296 (October 1994)). Such algorithms may use a data-flow analysis to recognize uninterrupted "read-modify-write" sequences to the same address. A special instruction, "load-exclusive" may then replace load instructions in such sequences to obtain the cache block for that processor in an exclusive state at run time.

"Dynamic Self-Invalidation" (on the fly) techniques have been studied in the context of directory-based cache coherency protocols, whereby blocks are speculatively identified for invalidating when they are brought into the cache, but invalidation is deferred to some time subsequent to the initial fill of the block into the cache. (See for example, Proc. 22nd Intl. Sym. Comp. Arch., pp. 48–59 (June 1995)). Such protocols have usually identified the blocks for self-invalidation by associating a version number with each cache block in the cache and then with each entry in the directory. On responding to a read request, the directory compares the version number of the entry with that of the cache block, and provides the block with a self-invalidation marking if the two numbers mismatch. Blocks thus marked are invalidated at each cache at synchronization points in the architecture. An address regeneration technique and additional memory are needed to generate acknowledgment messages responding to such synchronization invalidation requests.

"Read snarfing" (or "read broadcasting") has been discussed and evaluated as an enhancement to snooping cache coherence protocols that take advantage of the inherent broadcasting nature of the bus. (See for example, Proc. 1st Intl. Sym. High Perf. Comp. Arch., pp. 1–12 (January 1995); Proc. 16th Intl. Sym. Comp. Arch., pp. 2–15 (June 1989); and Proc. 22nd Intl. Sym. Comp. Arch., pp. 60–69 (June 1995)). Some experimentation has revealed situations where read snarfing may result in a decrease in coherence misses and bus utilization for some applications, but snooping overhead in such experiments due to a single-ported state and tag memory assumption that were utilized negated the benefits of read snarfing. Other models for shared-bus microprocessor architectures utilizing read snarfing have met with limited success regarding improved performance while reducing coherence misses.

SUMMARY OF THE INVENTION

An object of this invention is to provide an improved data processing apparatus having a shared-bus shared memory multiprocessors architecture. In particular, it is an object of the present invention to provide a self-invalidation means for individual processor nodes of the architecture to reduce the invalidation traffic on the shared bus of the apparatus, whereby cache blocks are invalidated locally without requiring an explicit invalidation shared-bus transaction.

A more particular object of the present invention is to provide such an architecture employing a simple hardware-oriented extension to a write-invalidate means, which is capable of being readily adopted into current multiprocessor technology with little hardware complexity. Preferably, such a self-invalidation means does not change the memory model as seen by a programmer.

Another more particular object of this invention to provide such an architecture within which both the self-invalidation means and a means of read snarfing adapted to operate with the self-invalidation is utilized to also reduce cache misses at an individual node due to an incorrect prediction of self-invalidation by the self-invalidation means.

A further preferred object of the present invention is to provide a method for controlling bus traffic in a shared bus multiprocessors apparatus by a write-invalidate coherence method adapted to utilize method step comprising:

providing a means for a hardware-oriented self-invalidation of cached data at local processor nodes as an extension to a means for write-invalidate control applicable thereto, and providing a means for conservative read-snarfing to reduce cache read and write misses due to an incorrect prediction of self invalidation by said self-invalidation means at said local processor nodes, and thereby reducing the coherence traffic of said shared-bus multiprocessors apparatus.

BRIEF DESCRIPTION OF THE DRAWINGS

FIG. 2 shows a state transition table listing a plurality of cache block states utilized for marking cache blocks in a self-invalidation protocol for self-invalidation based on specific local events or due to bus-induced actions.

FIG. 4 illustrates an example of cache block state four bit encoding to represent at least seven cache block states and to provide for a column-reset at barriers.

DETAILED DESCRIPTION OF THE INVENTION

The above objects and advantages of the present invention will become more apparent by describing in detail preferred embodiments thereof with reference to the attached drawings.

The combination of self-invalidation and read snarfing in an apparatus and method according to the invention can improve the execution time of a shared-bus multiproccessor shared-memory apparatus when the program being executed exhibits a great deal of coherence traffic. In machines with large caches or in a COMA (cache-only memory architecture) multiprocessor, the coherence overhead might be more pronounced than other components of an execution time, and a controlling mechanism for the coherence overheads can have a significant impact.

A. Cache Block Self-Invalidation

Three design goals of a self-invalidation technique for shared-bus multiprocessors are that it: (1) should be a simple extension to existing snooping protocols, (2) should remove as many invalidations as possible and (3) should not invalidate cache blocks unnecessarily to retain a low miss rate. The technique in one embodiment of the present invention utilizes an extension to the Illinois write-invalidate protocol, can eliminate invalidations aggressively and can be combined with a modified read snarfing technique, to keep a low miss rate. Such a modified snarfing technique is referred to below, and in the claims, by the term "conservative read snarfing".

The self-invalidation techniques has two phases, namely "marking" and "local-invalidation." The two phases are described below and are followed by an example of implementing the two phases according to the present invention. The implementation example and coherence scheme according to the present invention is also compared with some other related techniques.

1. Cache Block Marking

Cache blocks are marked for self-invalidation on specific events. The marking is incorporated in cache block states as can bee seen in FIG. 2, where the extended protocol is shown as a table. In FIG. 2, "SI*" and "Shared*" are special bus lines that distribute cache block sharing information during bus transactions, the former of which is introduced in example 1 below and the latter of which is the ordinary "shared" line used by other shared-bus multiprocessors. The states are in bold are from a base Illinois protocol (Modified, Exclusive, Shared, and Invalid) and others (M+, E+, and S+) mark a cache block for self-invalidation.

Figure 3:
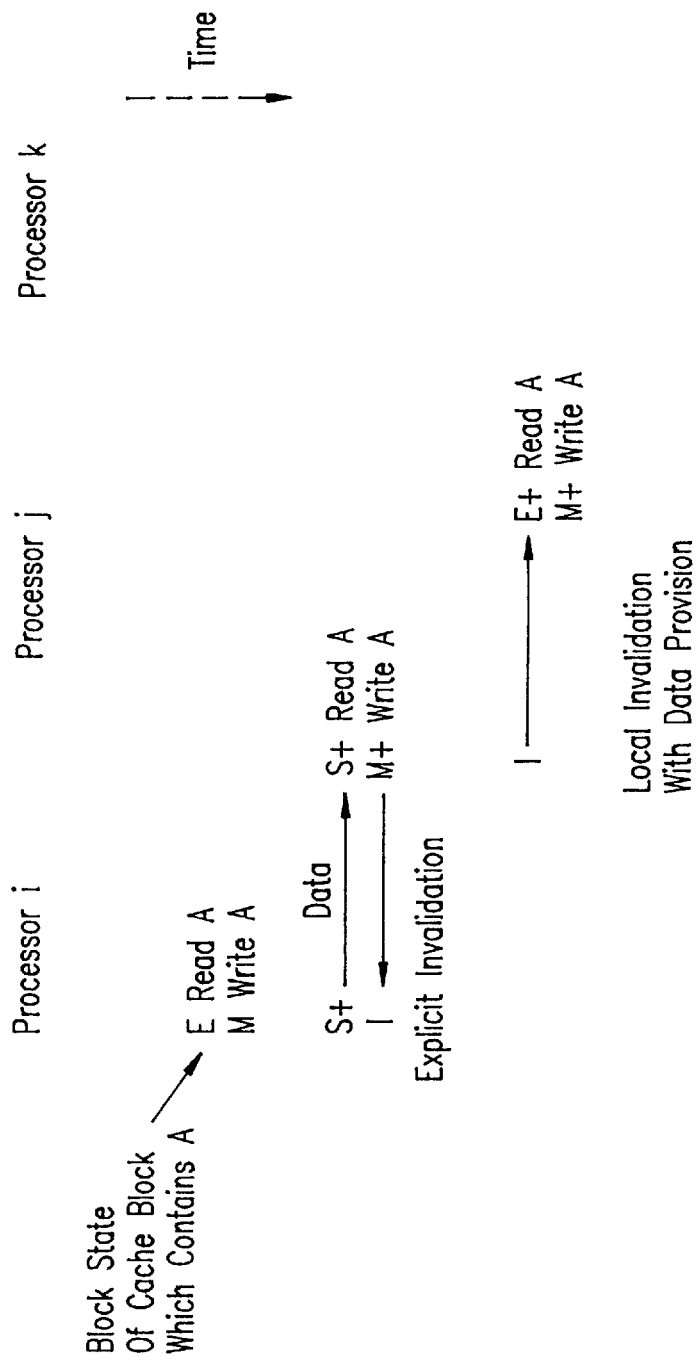
FIG. 3 illustrates an example of a migratory block of data and a state of events leading to labelling of a cache block as migratory data to provide synchronous exclusive accesses to the migratory block and thus avoid excessive block invalidations.

Cache blocks which have been written in a shared state are marked for eliminating future invalidations. A typical example of such blocks is the ones having a migratory object. A migratory object is in many cases guarded by lock-unlock synchronizations and exclusive access is thus observed, giving us an opportunity for eliminating explicit invalidations. The marking according to the present invention will detect migratory objects as in a Cox, et al. protocol ("Cox") and an example of such a case is shown in FIG. 3. (See Proc. 20th Intl. Sym. Comp. Arch., pp. 98–107 (May 1993)). Unlike the Cox scheme which pays attention to strictly migratory objects, the present coherence protocol according to the present invention aggressively classifies, for self-invalidation, candidates shared blocks that have a history of being written. This history is passed on to a requesting processor through the special bus lines, (SI* and Shared*), when a read request is seen on the bus.

2. Local Invalidation of Cache Blocks

A cache block in M+ state is locally invalidated when another processor requests for the block. The requesting processor will have the block in E+ state so that a later write will not generate an invalidation, and the state carries with it a speculation that the block will be locally invalidated as it becomes shared by multiple processors. Typical migratory objects will carry E+ or M+ state as depicted in FIG. 3.

Cache blocks in S+ state are all invalidated at a barrier synchronization point, since barriers give a good hint that the time sharing pattern will change across them. Our experimental results with Ocean and Radix from SPLASH-2 benchmark suite given in the next sections support this observation. Note that blocks in S+ can be safely invalidated because the main memory keeps the up-to-date value of such blocks as it snoops the bus also.

B. Preferred Embodiments

One may use a bus line (Migratory) to propagate sharing information, when a cache block is provided to a requesting processor. An embodiment of the present invention uses a bus line for a similar purpose and takes synchronization operations into account to invalidate cache blocks locally.

The data from examples of implementation of the techniques according to the present invention show that this local invalidation can cut down the number of invalidations in some programs. Such is found to be so even where there are access patterns that other adaptive protocols have not tried to optimize. Proposed Dynamic Self-Invalidation techniques have also used (acquire and release) synchronization points in invalidating marked blocks. However, since prior work had assumed a directory-based coherence protocol model, such techniques needed a special sequencing circuit to regenerate the cache block addresses to send acknowledgements at each synchronizations point. Such techniques also associate a 4-bit version number with each entry in the directory and each block in the caches which requires significant extra memory to trace such data block version information.

Since the self-invalidation coherence scheme according to the present invention is based on a shared-bus implementation, it does not require such an amount of extra memory as in the directory-based protocol. The present invention in one embodiment only adds slightly more bits for cache block states to the memory requirement (two bits per cache block).

In the Examples below the performance of the self-invalidation techniques for data block coherence, alone, and combined with conservative read snarfing, are evaluated and measured. The adaptive coherence protocol optimized for migratory sharing is compared in reducing coherence traffic. The bus traffic and cache miss rate under each scheme are also analyzed. The base Illinois protocol (comparison control) extended with read snarfing is also considered in such comparisons.

1. Architecture Model

Figure 1:
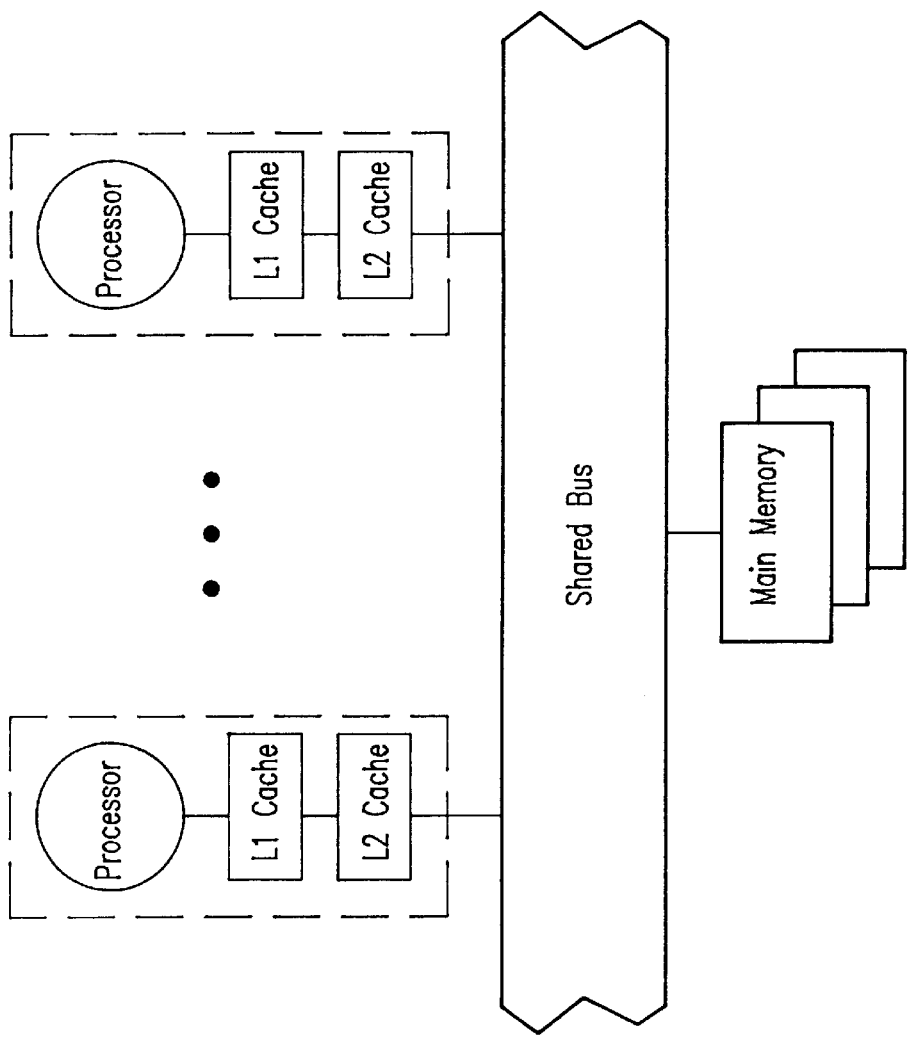
FIG. 1 is an illustration of a conventional shared-bus multiprocessor apparatus comprising a shared bus connected to a main memory, which shared bus is further connected to a plurality of processor nodes, with each processor node having a high-performance microprocessor and two levels of data caches (L1 and L2).

The shared-bus multiprocessor which is utilized in the experimental examples below is similar to the SGI Challenge multiprocessor. The base architecture for the experiments is similar to traditional shared-memory machines based on a shared bus as depicted in FIG. 1. Such an architecture includes a processor node which contains a high-performance microprocessor and two levels of data caches: a small direct-mapped first-level (L1) cache and a bigger set-associative second-level (L2) cache.

FIG. 1 is an illustration of a shared-bus multiprocessor apparatus comprising a shared bus connected to a main memory, which shared bus is further connected to a plurality of processor nodes, with each processor node having a high-performance microprocessor and two levels of data caches, an (L1) cache and a (L2) cache. The block size for the caches is 32 bytes. Write-through policy is used between L1 and L2 caches, and write-back policy is used between L2 caches and the main memory. In the model a "sequential consistency" is assumed for this shared-bus multiprocessor apparatus.

The shared bus is closely modeled after the POWERpath-2 bus of the SGI Challenge multiprocessor, which allows split transactions to efficiently support multiprocessors. It is clocked at 50 MHz, and has a 40-bit address bus and a 64-bit data bus. Moreover, the address and the data buses are arbitrated independently, thus creating a pipelining effect. Each bus transaction consumes five bus cycles, and a cache block (32 Bytes) can be transferred in one bus transaction. As in POWERpath-2, the bus protocol disallows coherence operations to cache lines which target a pending read. This can be done by having and maintaining a "pending read buffer" (read resource in POWERpath-2) per node. A read request will occupy the first available entry in the buffer when issued. The request is retired from the buffer when the response to the request is seen on the bus. Since every node snoops the bus and updates the buffer, the buffer is effectively a global table which bookkeeps the outstanding reads. Read replies get priority over other transactions to keep read latency low.

The state and tag memory of L2 caches is duplicated to minimize L2 cache lock-outs. Should a change to the L2 cache contents be necessary, actions from the bus have priority over local actions.

Synchronization operations such as "lock" and "unlock" pay an appropriate cost for reading or writing memory as they are implemented using LL ("Load Link") and SC ("Store Conditional") instructions in MIPS R4000. However, the "barrier" synchronization only needs N bus transactions for N processors and no coherence actions, given that each processor interface has a specialized count register as in the SGI Challenge multiprocessor.

The "Illinois protocol" (comparative protocol) is used in the base architecture to enforce cache coherence. Note that the main memory also snoops, i.e. it grabs data on a cache-to-cache transfer as well as on any explicit write-back.

2. Experimental Setup With the Multiprocessor Model

In the multiprocessor model of the examples below a set of six benchmark programs from SPLASH-2 is used to simulate parallel execution on the described multiprocessor model with 16 processors as described above. The simulator consists of two parts: a front end, (see J. Veenstra et al., "Mint: A Front-End for Efficient simulation of Shared-Memory Multiprocessors," in MASCOTS '94, January–February, 1994.), which simulates the execution of the processors, and a back end that simulates the memory system and the bus. The front end calls the back end on every data reference and synchronization operation, and the back end decides which processors block waiting for memory and which continue execution. Since the decision is made on-line, the back end affects the timing of the front end, so that the flow control of the application, and the interleaving of instructions across processors, can depend on the behavior of the memory system and the bus.

The simulator utilized in the examples below is capable of capturing contention within the bus and in the state and tag memory due to conflicting accesses from the processor and the bus. The simulator assumes no stalls for instruction fetching, and that an instruction can be executed in a processor clock cycle (pclock) if there is no data cache miss. L1 cache is 2 KBytes and the access time is hidden if an access hits in the cache. It has a 4-pclock block fill time. The 4-way set-associative L2 cache is 128 KBytes and has a cycle time of 40 ns (8 pclocks). A fully interleaved main memory with an access time of 120 ns is also assumed.

Program descriptions and inputs are summarized in Table 1, below, for the 6 programs from the SPLASH-2 benchmark suite, which are utilized to drive the simulator. The programs are all written in C using the ANL macros to express parallelism and are compiled with the –02 optimization flag. For all measurements, statistics are gathered during the parallel sections only. The LU program utilized is LU-C (contiguous block allocation version).

TABLE 1

| Program | Description | Input |
|---|---|---|
| Cholesky | Cholesky factorization of a sparse matrix | bcsstk14 |
| LU | LU decomposition of a dense matrix | 300 × 300 matrix, 16 × 16 block |
| FFT | Complex 1-D version of radix-$\sqrt{N}$ six-step FFT | 256K points |
| Ocean | Ocean basin simulator | 130 × 130 ocean, $10^{-7}$ tolerance |
| Radix | Radix sorting | 200,000 integers |
| Water | Simulates evolution of a system of Water molecules | 512 Molecules, 3 time steps |

EXAMPLE 1

Self-Invalidation Implementation

For the marking phase of the self-invalidation scheme according to the invention, a special bus line, SI* is necessary. SI* is asserted by the owner of a requested cache block, which gives hint to the requesting node in deciding the state of the incoming block. (Cox's work assumed a similar bus line for a much different purpose ("Migratory" line).

For the timing of the self-invalidation, the memory system should be able to see the synchronization operations. This is not hard, and in fact many optimizations such as release consistency assume that lock, unlock, and barrier synchronizations are seen by the memory system. The barrier synchronization is utilized in this embodiment.

To efficiently perform the self-invalidation at synchronization points, a column-reset circuit and a redundant encoding of cache block states are needed. The column-reset function for cache flushing is already provided by commodity cache controllers. An example of a redundant encoding is shown in FIG. 4. Although 3 bits are sufficient to encode 7 states, the present embodiment adds one more bit for efficient state change at barriers. Column reset for this bit will force blocks in S+ state into an invalid state for all such caches at the same time.

Given the 4-bit encoding, the overhead for the extra bits seems to be small. With a 40-bit address bus and a 32-Byte block size, a four-way set-associative 64-KB cache and a 1-MB cache, require an addition 0.704% ((2)/((32×8+(40–5–9)+2)) and 0.714% ((2)/((32×8+(40–5–13)+2)) memory overhead respectively, compared to an Illinois protocol with 2-bit encoding.

The experimental results demonstrate that the self-invalidation coherence protocol according to the present invention is highly effective in decreasing the number of invalidations. The data show an average of 71.6% for the benchmark programs studied.

Figure 6:
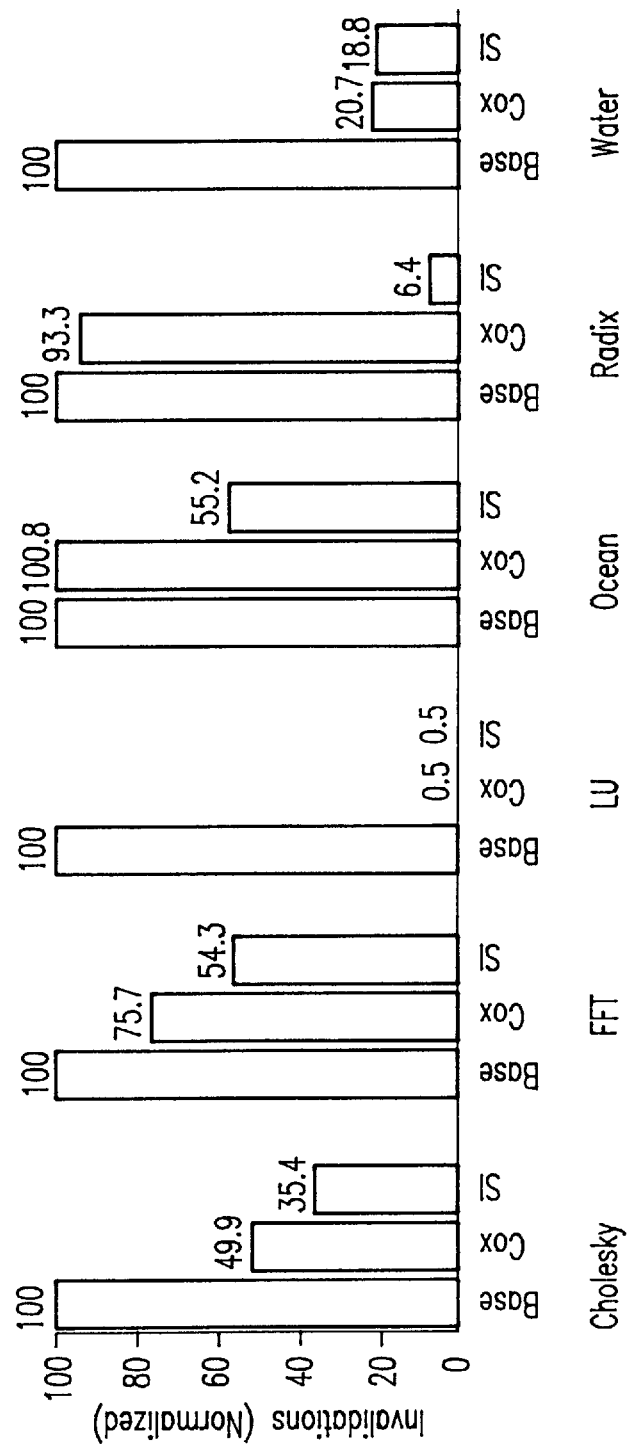
FIG. 6 is a histogram representation of experimental data results showing how the adaptive protocol for migratory sharing and self-invalidation reduce the coherence traffic, compared to the base Illinois protocol.

FIG. 6 shows how the adaptive protocol for migratory sharing (Cox in FIG. 6) and self-invalidation (SI) reduce the coherence traffic, compared to the base Illinois protocol (base in FIG. 6). Both of the schemes were able to reduce the coherence traffic to a considerable amount. Especially in LU, invalidations were eliminated almost completely. There are two programs, however, which exhibit big difference between the two schemes: Ocean and Radix. Ocean is known to have little migratory sharing, and has a lot of barrier synchronizations. Radix also contains more barriers than locks. The adaptive protocol does not reduce much traffic in thews two programs since there are few strictly migratory data accesses, whereas SI reduces a large portion, by invalidating marked cache blocks at barriers. Since read snarfing is not targeted to reduce invalidations, it is not considered in the experiment whose data are represented in FIG. 6.

EXAMPLE 2

Self-Invalidation Coherence with Read Snarfing

The potential of combining read snarfing with the present self-invalidation coherence scheme according to the invention to enhance it was investigated. The two techniques have contradicting properties in that self-invalidation tries to keep the degree of sharing low for shared cache blocks, whereas snarfing tries to maximize the sharing at all read requests.

Read snarfing hence cannot directly mix together with the self-invalidation techniques.

Read snarfing was modified according to the present invention to adapt to a self-invalidation coherence protocol. After such modifications, processors read-snarf only when a read request makes a block cached in at least two caches. In other words, read snarfing becomes conservative, and it waits until the second reads miss occurs for the same cache block without an intervening write before acting.

Figure 5:
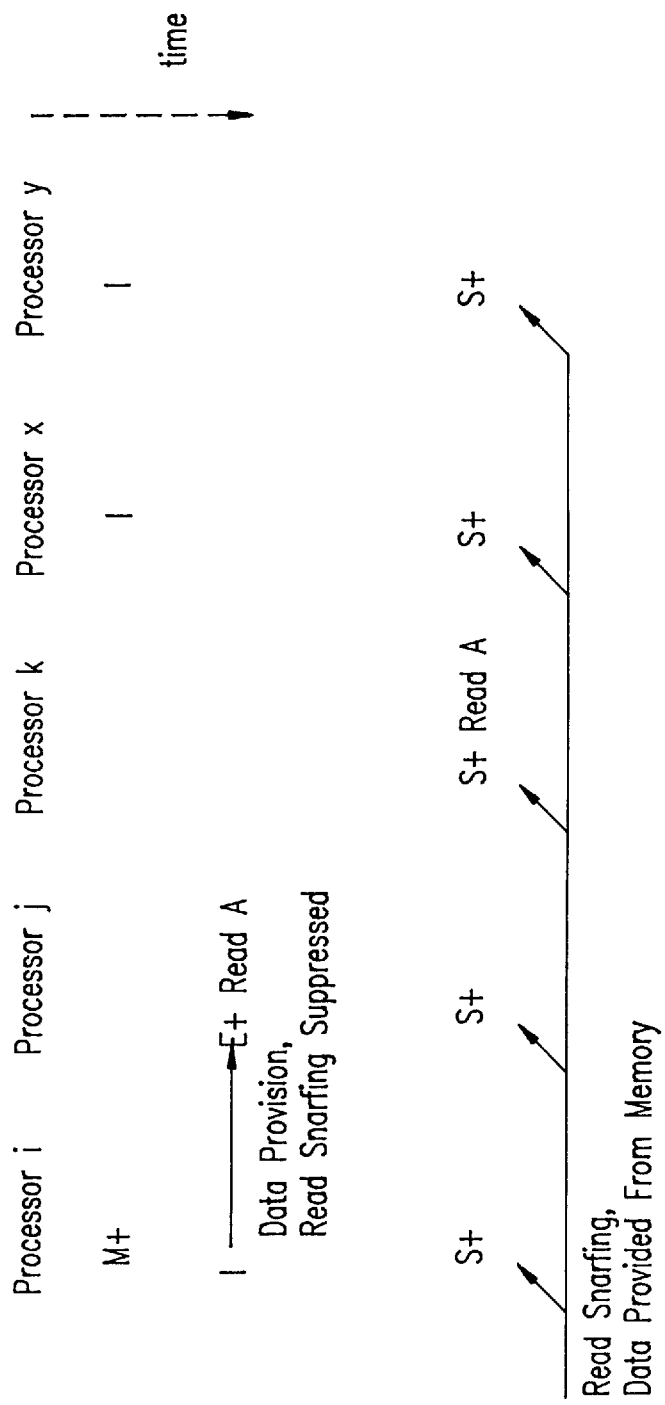
FIG. 5 illustrates a conservative read snarfing technique according to the present invention.

FIG. 5. illustrates a conservative read snarfing technique according to the present invention. It suppresses read snarfing such that read snarfing only operates when a read request causes a block to be in at least two caches and then only after a second read access miss occurs for the same cache block without an intervening write. FIG. 5 shows a read reference (misses in the local cache) by "Processor$_j$" ($P_j$) would trigger reading the processor by $P_x$ and $P_y$ in the original read snarfing, whereas in the conservative read snarfing, reading by all other processors is suppressed and deferred until the second read (by $P_k$) occurs. The resulting state is S+ and blocks can be self-invalidated at a later barrier.

Conservative read snarfing is helpful since most invalidation misses are caused by a re-read by a single processor. For migratory objects, the conservative read snarfing does not hinder self-invalidation.

The conservative read snarfing can be easily implemented by using Shared* line as a hint for snarfing. If the line is not asserted when a read request is on the bus, snarfing action is simply suppressed, and if the line is asserted, read snarfing is performed and the resulting state will be set to S+ for all cached copies.

The data show that self-invalidation enhanced with snarfing reduced the address bus traffic by 13.6% on average. Such results promise potential improvement of execution time if coherence traffic dominates the bus traffic of a program. Moreover the coherence scheme according to the present invention adds little to the hardware complexity of modern shared-bus multiprocessors.

Figure 7:
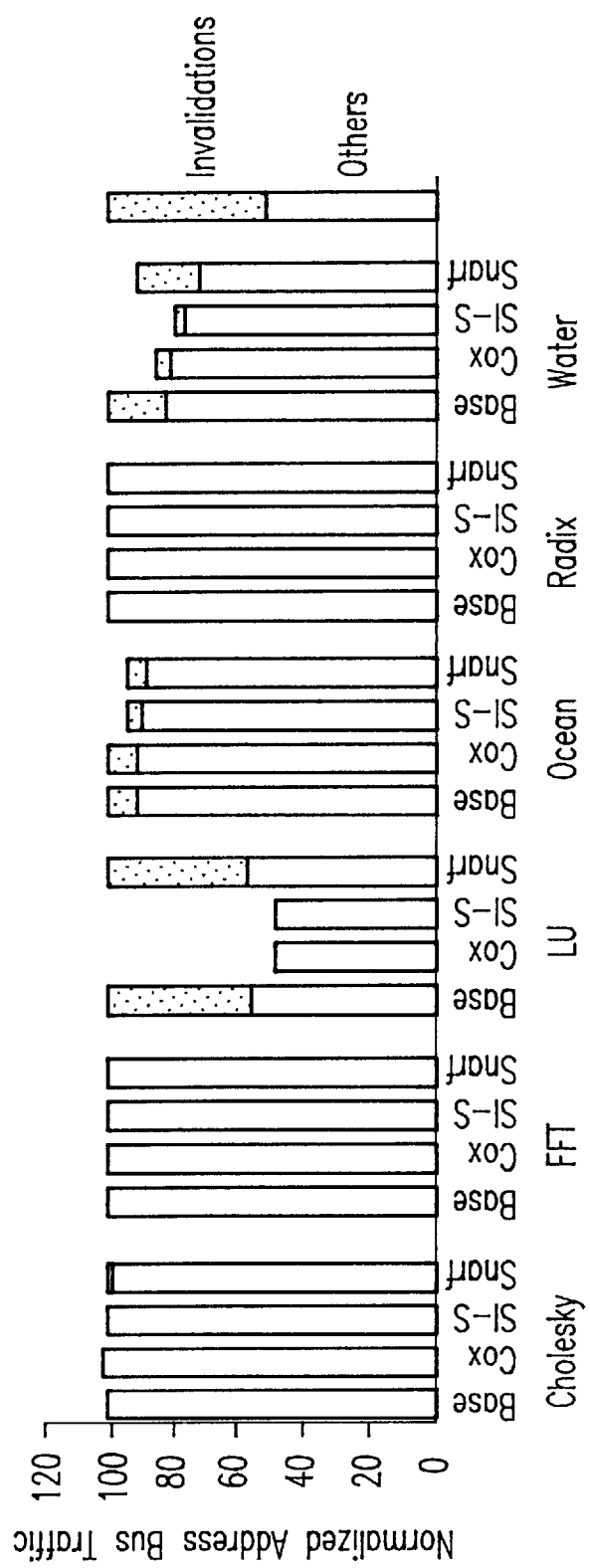
FIG. 7 shows is a histogram representation of experimental data showing the number of address bus transactions utilizing an architecture according to the present invention as compared to (normalized to) address bus transactions of the base machine with the Illinois protocol.

FIG. 7 shows the number of address bus transactions normalized to that of the base machine with Illinois protocol, wherein we split bus transactions into invalidations and others. As already shown in FIG. 6, the adaptive protocol and self-invalidation with conservative read snarfing were able to cut down the number of invalidations in all programs. Notice that read snarfing does not reduce coherence traffic, although it reduces other traffic (mostly memory requests) in Ocean and Water. Interestingly, in LU, read snarfing didn't help reduce traffic. In Cholesky, the adaptive protocol and SI-S generate more memory request traffic than Base, due to a slight increase in the cache miss rate from incorrect prediction, which was not covered by the conservative read snarfing. On average, the adaptive protocol, SI-S, and Snarf reduced 11.1%, 13.6%, and 2.7% of the bus traffic respectively.

Figure 8:
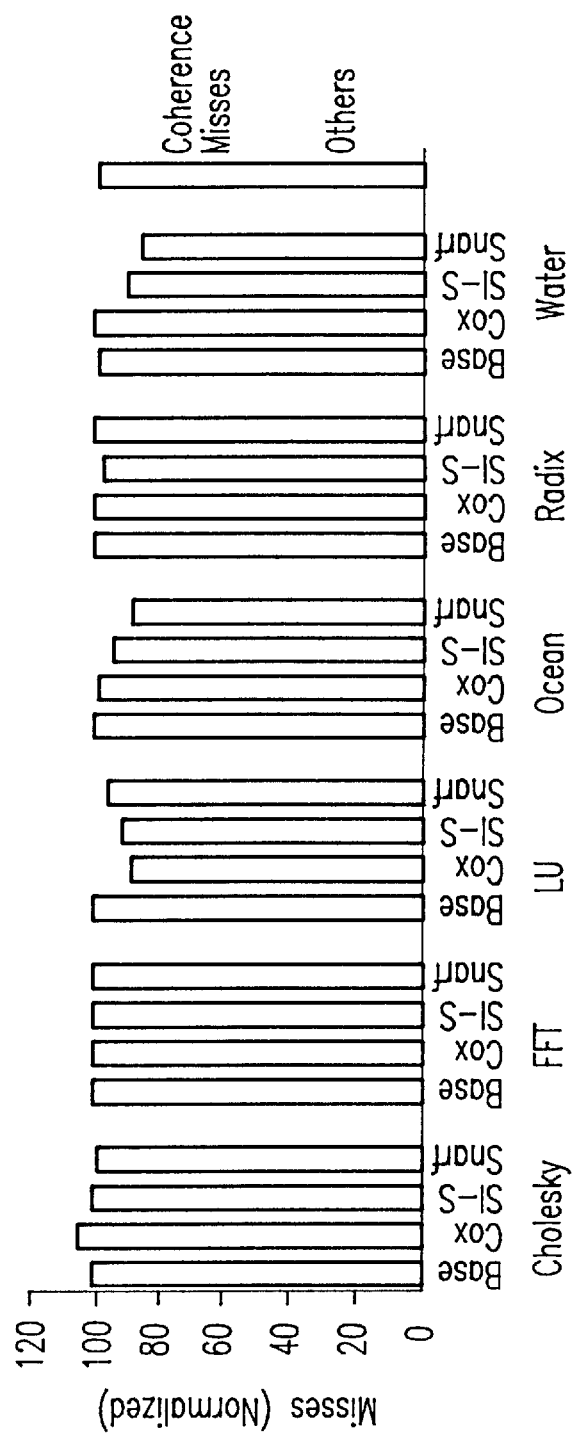
FIG. 8 is a histogram representation of experimental data showing the number of cache misses utilizing an architecture according to the present invention as compared to (normalized to) cache misses of the base machine with the Illinois protocol.
Figure 9:
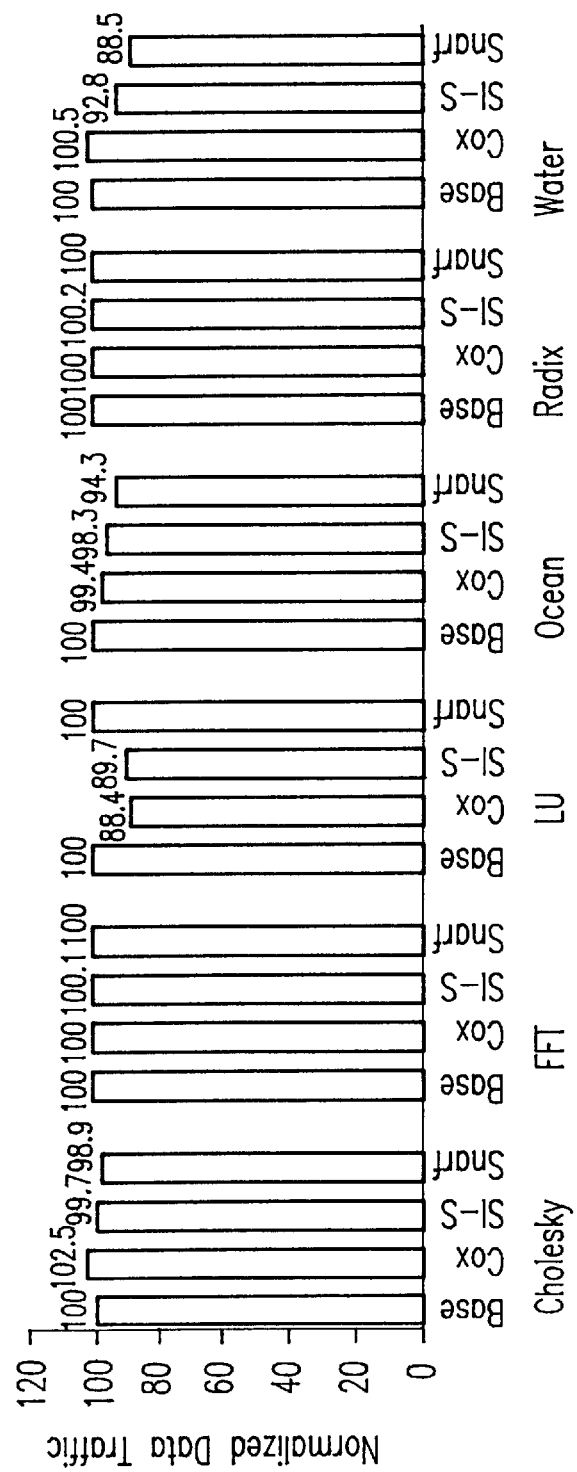
FIG. 9 is a histogram representation of experimental data showing the amount of data traffic on the shared-bus utilizing an architecture according to the present invention as compared to (normalized to) data traffic on the shared-bus of the base machine with the Illinois protocol.

FIG. 8 shows how each scheme has effects on cache misses. Read snarfing consistently reduced coherence misses compared to Base. Despite the large number of coherence misses in LU, however, read snarfing could reduce this number only slightly. This raises a question on effectiveness of read snarfing in certain programs. FIGS. 7 and 9 show that read snarfing reduced neither address traffic, nor data traffic in LU. Very frequent invalidations are suspected to nullify the effectiveness. SI-S was also effective in decreasing the number of coherence misses, but not as much as read snarfing in Ocean and Water, due to its conservativeness. FIG. 9 shows the data traffic normalized to base, which is naturally proportional to the number of cache misses shown in FIG. 8.

Measurements of the performance of the self-invalidation technique according to the invention on more parallel applications, and under different architecture models such as a COMA multiprocessor can also illustrate how it can handle coherence overheads. Further, self-invalidation protocols might advantageously be incorporated into write-update protocols to reduce excessive bus traffic associated with the such protocols while taking the advantage of inherently low miss rate of write-update protocols.

It should be understood that the invention is not limited to the illustrated embodiment and that many changes and modifications can be made within the scope of the present invention by a skilled person in the art.

What is claimed is:

1. A method of maintaining local cache coherency in a shared bus, shared-memory multiprocessor apparatus comprising a plurality of processors each having at least one local cache, said local caches connected to said shared bus, said method comprising:

marking a cache block for self-invalidation at a first local cache of a first processor whenever said first local cache receives a write request for said cache block from a second local processor;

marking said cache block for self-invalidation at a first local cache of a first processor whenever said first local cache receives a read request for said cache block from a second local processor, whenever said cache block is in a modified state at said first local cache;

self-invalidating said marked cache block at a second local cache of said second processor in response to a write request for said marked cache block by the first processor or a third processor; and self-invalidating said marked cache block at said second local cache in response to a read request for said marked cache block by the first processor or a third processor, whenever said marked cache block is in a modified state at said second local cache.

2. The method of claim 1, further comprising:

conservatively read-snarfing, by one or more read-snarfing processors in said apparatus, a requested cache block.

3. The method of claim 2, wherein said one or more read-snarfing processors read-snarfs said requested cache block when a Shared line is asserted for said requested cache block, and does not read-snarf said cache block when said Shared line is not asserted for said cache block.

4. The method of claim 3, wherein said one or more read-snarfing processors mark said requested cache block for self-invalidation.

5. The method of claim 1, further comprising self-invalidating the marked cache block in response to a synchronization event on said shared bus.

6. The method of claim 5, wherein self-invalidating the marked cache block in response to a synchronization event on said shared-bus, further comprises resetting a line in said shared bus indicating a state of said marked cache block.

7. A shared-memory multiprocessor apparatus, comprising:

a plurality of processors, each of said processors having a local cache;

a shared bus connected to each said local cache, said shared bus further comprising a Self-Invalidation line and a Shared line, said Shared line indicating a shared status for a cache block;

marking means at each of said local processors for setting said Self-Invalidation line for marking the cache block to produce a marked cache block; and self-invalidating means at each of said local processors for self-invalidating said marked cache block.

8. The apparatus of claim 7, further comprising;

read-snarfing means at each of said local processors for conservatively read-snarfing a requested cache block on said shared bus.

9. The apparatus of claim 8 wherein said read-snarfing means read-snarfs said requested cache block when said Shared line indicates that said requested cache block is shared, and does not read-snarf said requested cache block when said Shared line indicates that said requested cache block is not shared.

* * * * *